United States Patent [19]

Heller et al.

[11] Patent Number: 4,997,576
[45] Date of Patent: Mar. 5, 1991

[54] MATERIALS AND METHODS FOR PHOTOCATALYZING OXIDATION OF ORGANIC COMPOUNDS ON WATER

[75] Inventors: Adam Heller; James R. Brock, both of Austin, Tex.

[73] Assignee: Board of Regents, The University of Texas System, Austin, Tex.

[21] Appl. No.: 412,317

[22] Filed: Sep. 25, 1989

[51] Int. Cl.$^5$ ............................................. C02F 1/30
[52] U.S. Cl. .................................. 210/748; 210/763; 210/925
[58] Field of Search ............... 210/748, 749, 763, 758, 210/922, 925

[56] References Cited

U.S. PATENT DOCUMENTS

| | | | |
|---|---|---|---|
| 2,885,366 | 4/1969 | Iles | 106/300 |
| 3,437,502 | 5/1959 | Werner | 252/313 |
| 3,562,153 | 2/1971 | Tully et al. | 210/693 |
| 4,474,852 | 10/1984 | Craig | 427/205 |
| 4,863,608 | 9/1989 | Kawai et al. | 210/763 |

FOREIGN PATENT DOCUMENTS 76028  1/1988  Australia .............................. 210/763

OTHER PUBLICATIONS

Payne et al., "Photochemistry of Petroleum in Water", Environ. Sci. Technol., vol. 19, No. 7, pp. 569-579 (1985).
Gesser et al., "Photooxidation of n-Hexadecane Sensitized by Xanthone", Environmental Science & Technology, vol. II, No. 6, pp. 605-608 (1977).
Pilpel, "Photo-Oxidation of Oil Films Sensitized by Naphthalene Derivatives", Institute of Petroleum, IP 75-007 (1975).
Cretney et al., "Biodegradation of a Chemically Dispersed Crude Oil", EPA/API/USCG Oil Spill Conference (3/25/81) pp. 37-43.
American Petroleum Institute, "Oil Spills: Their Fate and Impact on the Marine Environment", Oil Companies International Marine Forum/International Petroleum Industry Environmental Conservation Association Report, pp. 1-26 (Mar. 1980).
Hansen, "Photochemical Degradation of Petroleum Hydrocarbon Surface Films on Seawater", Marine Chemistry, vol. 3, pp. 183-(1975).
Anikiyev et al., "Estimate of the Efficiency of Photochemical Degradation of Oil Pollutants in the Ocean", Dokl. Earth Sci. Sect., vol. 259, pp. 218-221 (1981).
Parker et al., "The Effect of Some Chemical and Biological Factors on the Degradation of Crude Oil at Sea", Water Pollution by Oil, pp. 237-244 (1970).
Philpel, "Le Soleil, Notre Allie Dans la Lutte Contre la Pollution", Chimia, vol. 28, No. 5, pp. 261-262 (1974).
Heller et al., "Controlled Suppression and Enhancement of the Photoactivity of Titanium Dioxide (Rutile) Pigment", The Journal of Physical Chemistry, vol. 91, No. 23, pp. 5987-5991 (1987).
Heller, "Hydrogen-Evolving Solar Cells", Science, vol. 223, pp. 1141-1148 (1984).
Soloman et al., "2,4 Photochemical Activity of Titanias", Chemistry of Pigments and Fillers, pp. 62-84 (1981).
Kalyanasundaram, "Semiconductor Particulate Systems for Photo-Catalysis and Photosynthesis-H. Photooxidation of Organic Materials", Energy Resources Through Photochemistry and Catalysis, p. 232 (1983).
Sakata et al., "10.VII. Application of Photocatalytic Reaction to Organic Synthesis", Energy Resources
(List continued on next page.)

[57] ABSTRACT

A bead having an exterior surface which is at least partially coated with a material that under illumination and in the presence of air is capable of accelerating the oxidation of organic compounds floating on water. The coated bead is water floatable and has an equivalent diameter of less than about 2 mm, preferably on the order of 10-30 microns. These coated beads can be used to accelerate under illumination oxidation of a floating oil film (e.g. from an oil spill) by dispersing the coated beads in the film and allowing them to be exposed to solar illumination and oxygen.

35 Claims, 1 Drawing Sheet

OTHER PUBLICATIONS

Through Photochemistry and Catalysis, pp. 355–358 (1983).

Sax et al., Dangerous Properties of Industrial Materials, p. 1172 (4th ed. 1975) (1987).

Colling et al., "The Durability of Paint Films Containing Titanium–Dioxide–Contraction, Erosion and Clear Layer Theories," Advances in Organic Coatings Science and Technology, vol. IV, pp. 205–238 (1982).

Berner et al. "Light Stabilization of Automotive Coatings," Advances in Organic Coatings Science and Technology, vol. IV, pp. 334–354 (1981).

Thomas, "Single-Layer $TiO_2$ and Multilayer $TiO_2$–$SiO_2$ Optical Coatings Prepared from Colloidal Suspensions," Applied Optics, vol. 26, No. 21, pp. 4688–4691 (1987).

*Primary Examiner*—Peter Hruskoci
*Assistant Examiner*—Krisanne Shideler
*Attorney, Agent, or Firm*—Arnold, White & Durkee

MATERIALS AND METHODS FOR PHOTOCATALYZING OXIDATION OF ORGANIC COMPOUNDS ON WATER

BACKGROUND

1. Field of the Invention

This invention relates to materials and methods for photocatalyzing the oxidation of organic compounds floating on water, such as those typically resulting from an oil spill.

2. Description of Related Art

Oil spills in the world's oceans and seas have a potentially damaging effect on the environment. Oil entering the seas can have a harmful impact not only upon the marine ecosystem, but also upon commercial and recreational resources of coastal areas.

Organic compounds invade the world's waterways from many sources in addition to oil spills. For example, refineries located along rivers often introduce substantial amounts of organic products and waste into the water. Organic compounds from landfills and waste sites can leach down to water tables below the earth's surface. Recreational motorboats often exhaust and leak a certain amount of oil and gasoline into lakes and reservoirs. These are just a few of the sources of organic compounds entering water resources.

The problems associated with petroleum in water may be ameliorated over time through various natural treatment processes. Among these are evaporation, dissolution, dispersion, adsorption onto suspended particulate matter, sinking, and microbial oxidation.

Another naturally occurring process for treating oil films on water is photocatalytic oxidation (alternatively referred to as photoassisted or photochemical oxidation or as photooxidation). Since oil and related organic materials generally have a lower density than water, they tend to float on the surface of water as a film, and are thereby exposed to a significant amount of solar illumination. Natural photocatalytic oxidation of floating oil films has been the subject of several studies, and it is generally known that oxidation of organic compounds in oil can be naturally photocatalyzed and that the oxidation products are generally more water soluble and/or less refractory compounds, such as alcohols, ketones, and carboxylic acids. These photooxidation products may be environmentally less harmful, because after dissolving, they tend to be more readily attacked by microorganisms for eventual complete oxidation to $CO_2$.

Techniques for cleaning oil slicks have been tried and are discussed in the literature. For example, mechanical clean-up methods, such as the use of booms, skimmers, and absorbents, have been used. However, these are impractical in many situations.

Chemical techniques have also been tried. For example, dispersants and emulsifiers may be used to accelerate natural dispersion of oil. However, these techniques are environmentally damaging in many situations, as they may simply direct the oil and resulting damage away from the water surface to underlying depths.

Another technique which has been suggested is the use of organic photosensitizers to photocatalyze the oxidation of the oil film. A potential problem with this type of technique is that the wavelengths needed to excite the oil-dissolved photosensitizer are often absorbed by other constituents of the oil film. Furthermore, even if the photosensitizer has been excited by a photon, it may be "quenched", i.e. transfer energy to another dissolved compound that is not an adequate photosensitizer. Therefore, this technique has not been widely accepted.

Thus, there is a continuing need for environmentally safe and beneficial methods for treating organic compounds which float on and plague the surface of bodies of water. It is an object of this invention to provide materials and methods for such treatment which overcome or reduce at least some of the disadvantages of the prior art.

SUMMARY OF THE INVENTION

One broad aspect of the present invention provides a bead having an exterior surface that is at least partially coated with a material that under illumination and in the presence of air is capable of assisting in (i.e. accelerating) the oxidation of organic compounds floating on water, the coated bead being water floatable. The term "bead" is used broadly herein to mean a piece of material having virtually any three-dimensional shape (e.g. spherical, octahedral, prismatic, or of irregular cross-section). The coated beads contemplated by this invention have an equivalent diameter of less than about 2 millimeters.

The term "equivalent diameter" is used herein to mean the diameter of a sphere which would have the same volume as the bead. Thus, for example, if the bead has a volume of $pi/6$ mm$^3$, it has an equivalent diameter of 1 mm.

The term "water floatable" means that the coated bead has such physical characteristics that it will float at or near the surface of water either indefinitely (e.g. until washed ashore or dissolved) or for a sufficient period of time such that the material coated on the bead can be effective to assist in, induce or accelerate oxidation of organic compounds floating on the water under sunlight. The coated bead may be made floatable in at least three ways. First, the coated bead may have a density less than the density of water. Second, the coated bead can be treated such that it is substantially hydrophobic (i.e. oleophilic), and therefore be kept by interfacial forces on the film near the water surface. Finally, the coated bead can be made sufficiently small for the sedimentation velocity to be substantially reduced, particularly in viscous oils. By making coated beads of such small dimension, their precipitation time through an oil film may be long enough such that they are in contact with the oil film for a sufficient length of time to effect photooxidation thereof. For example, the coated bead size could be small enough such that the sedimentation velocity would be on the order of $10^{-6}$ centimeters per second, thereby making their precipitation time through a typical oil film longer than about 24 hours.

Preferably, when used to treat oil slicks on the surface of an ocean or sea, the coated beads provided by this invention have a density less than the density of sea water. The coated beads will therefore tend to float along with the oil slick on the surface of the sea water. More generally, the coated beads preferably have a density less than the density of the water onto which they are to be dispersed.

Preferably, the bead has a relatively high index of refraction, and the coating material has an even higher index of refraction. In this way, the bead may tend to trap and waveguide light to the photocatalytic coating material. This is desirable, since generally the more light that reaches the photocatalytic coating material, the greater the photon flux for photoassisted oxidation of the oil by oxygen.

Specifically, it is preferred that the photocatalytic coating material have an index of refraction of at least about 2. Examples of such materials are zinc oxide (n=about 2), zinc sulfide (n=about 2.3), titanium dioxide (n=about 2.8), and iron oxide (n=about 2.9). It is preferred that the bead have an index of refraction of at least about 1.5 (as is typical of most $SiO_2$-based glasses) or 1.6 (as is typical of most ceramics).

The term "index of refraction" as used herein is that measured at the sodium D-line near 589 nm. In the context of a hollow bead as used in certain embodiments of this invention, the index of refraction refers to the bead shell material only, and not the hollow (air) interior.

The coating material preferably comprises an n-type semiconductor having a band gap of at least about 2 eV. The coating material is also preferably photoconductive. Specific compounds which may be used alone or in combination as the coating material include titanium dioxide, zinc oxide, zinc sulfide, and iron oxide. Other compounds may be effective as photocatalysts, but may be less preferable either because of their toxicity, or because of their photodecomposition (i.e. photooxidation of their surface or photodissolution).

Preferably, the beads comprise an inorganic material, which generally may be coated readily with photocatalytic compounds. For example, hollow glass or hollow ceramic beads may be used.

Alternatively, the bead may comprise an organic material. However, since a photocatalytic coating material may tend to photocatalyze the oxidation of an organic bead material by oxygen, the bead preferably should be protected with an intermediate layer comprising a material which will not allow oxidization of the organic bead material or itself be oxidized by oxygen in a process photocatalyzed by the outer coating material. The organic bead material may be, for example, a plastic material such as polyethylene or polypropylene. The protective intermediate layer may be for example, silicon dioxide or aluminum oxide.

In general, the smaller the coated bead provided by this invention, the more economical it will be in use. In any event, the size of each coated bead is preferably less than the thickness of the oil film to be treated.

In order to take advantage of the optical properties of the coated beads and their ability to trap light, the lower limit on the equivalent diameter of the coated beads is on the order of about one tenth of the wavelength of light. This is so because if the beads are smaller, their dielectric properties (including their index of refraction) tend to be averaged with those of the medium in which they are immersed, and light of appropriate wavelengths (e.g. longer than 200 nm) will not substantially refracted or reflected at the particle-liquid interface. In order to optically guide and trap light, coated beads with an equivalent diameter of at least about 30-100 nm are thus preferred.

Preferably, the coated beads provided by this invention have an equivalent diameter of less than about 200 microns, more preferably less than about 100 microns, and most preferably between about 10 and 30 microns, but have at least a 30 nm equivalent diameter.

In certain embodiments, the invention provides coated beads which are oil dispersible and water floatable and capable of accelerating the oxidation of hydrocarbons in the presence of oxygen and light. The term "oil dispersible" as used herein means that the coated beads are capable of being dispersed in or on oil. That is, they may have a surface that makes them wetted by oil.

In another broad aspect, the present invention provides a method for treating an oil film floating on a body of water using the coated beads described above. The method comprises the steps of dispersing a plurality of such coated beads on an oil film, and allowing the coated beads to be exposed to solar illumination and ambient air, thereby accelerating the oxidation of organic compounds in the oil film. Preferably, the coated beads have an average equivalent diameter less than the average thickness of the oil film, and the coated beads float at or near the surface of the oil film. In certain embodiments, light may be trapped by the beads and waveguided to the coating material.

Finally, in another broad aspect, the present invention provides a method for treating an oil film floating on a body of water comprising the steps of dispersing a plurality of water floatable particles on the oil film, the particles comprising a material that under illumination and in the presence of air is capable of oxidizing organic compounds in the oil film. The particles are allowed to be exposed to solar illumination and ambient air, thereby accelerating the oxidation of organic compounds in the oil film.

The term "particle" is intended to mean any form of solid particulate matter, but is not intended to include individual dissolved molecules. Specifically, the term particle as used herein includes particulates having on the order of at least 5 nm physical dimension.

Preferably, the particle material comprises an inorganic material, such as an n-type semiconductor having a band gap of at least about 2 eV. The particle material is also preferably photoconductive. Appropriate materials for use in this method include titanium dioxide, zinc oxide, zinc sulfide, and iron oxide.

DETAILED DESCRIPTION OF PREFERRED EMBODIMENTS

Various embodiments of this invention provide environmentally safe technology for treating crude oil slicks resulting from oil spills, in the form of coated beads designed to float with and photoassist in (i.e. photocatalyze) the oxidization of oil slicks when exposed to sunlight and oxygen dissolved in oil, dissolved in water, or in air.

In a preferred embodiment, the beads consist of hollow glass or ceramic microspheres of about 10-30 microns diameter. Beads of this type are manufactured and are commercially available. Their density is about 0.4 $g/cm^3$ for glass beads and about 0.7-0.8 $g/cm^3$ for ceramic beads. Microbeads of 10-30 microns diameter are nearly invisible to the human eye, and thus not an eyesore. Larger microbeads could alternatively be used and would typically have the appearance of white sand.

Figure 1:
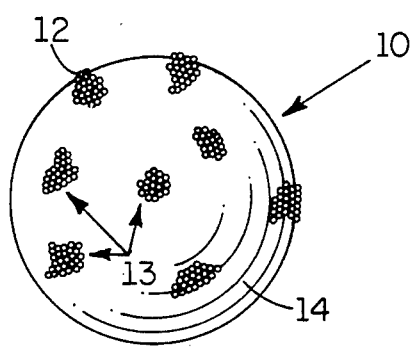
FIG. 1 is an exterior view of a partially coated bead as provided by a preferred embodiment of the present invention.
Figure 2:
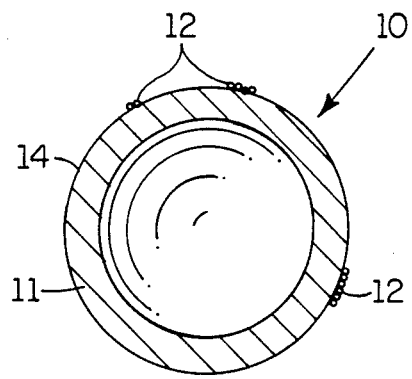
FIG. 2 is a sectional view of the coated bead shown in FIG. 1.

FIGS. 1 and 2 illustrate a preferred coated bead for use in this invention. Each hollow bead 11 may be coated at random sites with a photocatalytic coating material 12, resulting in a bead with coated areas 13 and uncoated areas 14. The bead may alternatively be fully coated, but is preferably only partially coated so as to save on coating material. In this case, sunlight may enter the coated bead 10 through exposed areas 14 and may be waveguided to the coating material 12, as described in more detail below.

Figure 3:
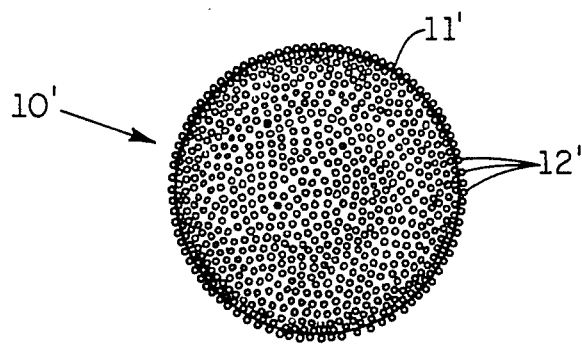
FIG. 3 is an exterior view of another partially coated bead as provided by this invention.

In an alternative embodiment as illustrated in FIG. 3, the coating material 12' may be dispersed relatively uniformly on the bead 11'.

In a preferred embodiment, the coating material 12 comprises $TiO_2$ pigment particles having diameter on the order of 30–200 nm. $TiO_2$ (rutile) or $TiO_2$ (anatase) are particularly preferred for use in this invention, as they are widely used white pigments, and are well known as photocatalysts in the oxidation of contacting organic compounds. Both are substantially nontoxic and environmentally harmless. Both are n-type semiconductors with 3 eV and 3.3 eV band gaps, respectively. The high index of refraction ($n=2.8$) that makes $TiO_2$ (rutile) an excellent light scatterer also makes it a good collector of photons in the present system.

There is a great amount of literature on photoassisted (i.e. photocatalytic) oxidations with $TiO_2$. It has been theorized that absorption of a photon by $TiO_2$ produces an electron-hole pair. The photogenerated holes oxidize directly contacting organic compounds. The electrons reduce oxygen to a surface-bound peroxide, that also photooxidizes organic compounds. (It should be appreciated that any proposed theory presented herein is for illustrative purposes only, and the claims and disclosure should not be construed as being bound thereto).

Preferably, the coated bead 10 is engineered to have a density of around 0.4–0.9 g/cm$^3$, and the regions 14 of the bead that are not n-$TiO_2$ particle coated are made hydrophobic (i.e. oleophilic). In use, such coated beads will tend to be attracted to and float with an oil layer.

The coated beads may be prepared by starting with commercial hollow glass or ceramic microspheres and depositing on their surfaces a semiconducting photocatalyst by a gas phase process. For example, the surface of the beads may be prepared in a fluidizing bed arrangement by flowing through a stream of dry nitrogen that contains a surface di- or trialkoxy (or chloro) silane. Subsequently, a gaseous dispersion of $TiO_2$ pigment particles may be passed through the bed of activated microspheres.

Alternatively, the surface of the ceramic beads may be coated by a smoke of partially hydrolized, reactive titanium tetrachloride ($TiCl_4$) or tetraalkoxide (Ti-(OR)$_4$).

Simple and inexpensive methods exist for making $SiO_2$ (glass) hydrophobic (i.e. oleophilic) and thus obtain an oil-wetted coating on the bead, such as exposure to trimethyl chlorosilane vapor (e.g. a dry air-stream with trimethyl chlorosilane). Only one monolayer is typically needed to make the surface hydrophobic. Thus, the partially coated bead 10 may be exposed to such a material to render it substantially hydrophobic. Although the resulting hydrophobic organic monolayers may be photooxidized on the bead areas 13 coated with n-$TiO_2$ particles 12, they will remain on the uncoated glass or ceramic surface 14. Alternatively, the bead 11 surface may first be made hydrophobic, and subsequently partially coated with photocatalytic material 12.

Figure 4:
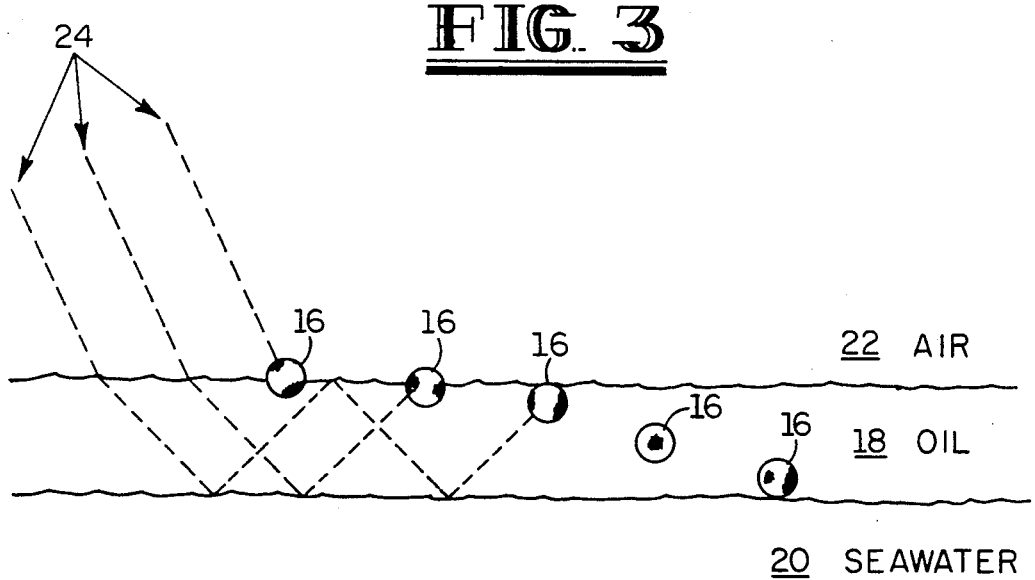
FIG. 4 is a schematic drawing showing coated beads dispersed in an oil film floating on water, as provided by preferred methods of practicing this invention.

As illustrated in FIG. 4, a plurality of water floatable, partially coated beads 16 may be dispersed within an oil film 18 on water 20. The beads 16 may be of varying density and degree of hydrophicity, and thus reside at differing depths of the oil film 18, as shown in FIG. 4. The diameter of the beads 16 is preferably less than the thickness of the oil film 18.

Typically, an oil film ($n=$about 1.45) is bounded by two media with lower refractive index, i.e. air ($n=1.00$) and seawater ($n=$about 1.34). Because of this, attenuated total reflection of incident sunlight may occur, causing part of the light to propagate in the oil film. The critical trapping angles at the air-oil and oil-water interfaces to achieve such propagation are typically about around 46° and 72°, respectively.

This phenomenon may be used advantageously in the practice of this invention. Referring again to FIG. 4, the coated beads 16, being preferably made of glass or ceramic, have an index of refraction at some or all of their surface of approximately 1.5 or more, which is above that of seawater and oil. Thus, incident sunlight (represented as dashed lines 24) may be partially trapped initially in the oil film 18, and then in the higher index coated beads 16 by total internal reflection of the light.

Because the index of refraction of $TiO_2$ (rutile) is about 2.8 (well above the index of the glass or ceramic), the light may be waveguided to the $TiO_2$ coating particles. By analogy, the effect may be similar to a high index dust particle (analogous to the $TiO_2$ on the bead) on an optical fiber (analogous to the oil film) carrying a laser beam (analogous to the reflected sunlight).

As a result, both direct and reflected light reach the photocatalytic coating material on the coated beads 16. Photons of less than 3 eV energy, absorbed by the particles, can produce a flux of oxidizing holes and peroxide forming electrons, thereby accelerating oxidation of organic compounds in the oil film 18.

In typical applications, some of the trapped light may be lost by absorption in the oil. In light crudes that are nearly colorless, there may be little attenuation. Nevertheless, even in typical heavy crudes, which at 337 nm may have extinction coefficient near 20 cm$^{-1}$, much of the light trapped in the oil film may end up in the high refractive index $TiO_2$-coated microbead.

The actual solar radiation collecting area per microbead will typically depend on the extinction coefficient through the 300–400 nm range. Even for highly absorbing oils, the effective collection area per microbead may be greater than approximately 0.01 cm$^2$, considerably larger than the actual bead surface area of the smaller beads of this invention.

In typical cases, the initial photooxidation products will be slightly water soluble alcohols, ketones, and carboxylic acids. Though not proven to be safe to sealife, these products can be highly diluted as they can dissolve in seawater. Also, the photooxidation products may be far more rapidly attacked by microorganisms (that eventually oxidize them to $CO_2$) than the hydrocarbons of a slick.

In the following discussion, a conservative estimate of oil slick removal rates is presented, based only on the bead surface area, without assuming any waveguiding in the films. The average daylight solar irradiance, at all wavelengths is, in the mid-latitudes, approximately 700 W/m$^2$. About 1.5% of the solar flux can produce an electron-hole pair in $TiO_2$—that is, exceeds the 3.0 eV band-gap of this semiconductor. Thus, the useful flux is approximately 10 W/m$^2$. For a 3 eV semiconductor, this represents an electron or hole current density of 3.3 A/m$^3$. When holes directly oxidize the oil, and when electrons reduce $O_2$ to a ($TiO_2$ surface-bound) oxidizing peroxide, two equivalents of oxidizer are produced per photon absorbed. Thus, if a hydrocarbon is solubilized by a two-electron oxidation reaction (e.g. is converted to an alcohol), the solar flux limited rate of oil stripping is about $3.2\times10^{-5}$ moles/m$^2$sec or approximately 1.4 moles/m$^2$day (1 day = 12 h.). If 4 or 6 electron-oxidation reactions are required to dissolve the oil, the corresponding values are approximately 0.7 and 0.5 moles/m$^2$, respectively. 0.7 moles/m$^2$day translates for the hydrocarbon dodecane (MW 170) to approximately 120 g/m$^2$day, equivalent to $8\times10^{-4}$ barrels/m$^2$day, i.e. to elimination of an oil film of 0.1 mm thickness over the 1 m$^2$ area in one day. Assuming that the hydrophobic particles float and stay with the oil slick until it is destroyed, and that their actual activity is only 0.2 of theoretical, 1 m$^2$ of the microbeads will eliminate in one month $5\times10^{-3}$ barrels of oil. Since the diameter of the preferred beads is approximately 10–30 microns, about 6 g of material will cover 1 m$^2$ of area (this is a conservative estimate, since each microbead may actually collect light from an area that is 10–100 times its own, even in a heavy, strongly absorbing crude, because of the wave-guiding properties of the oil film). At a cost of $1/lb, the materials cost is approximately 1.3¢/m$^2$. The corresponding materials cost for cleaning up 1 barrel of oil in one month is thus less than $2.60.

In an ocean clean-up, coated microbeads provided by this invention may be carried in and dispersed from bulk grain or fertilizer carrying ships, then dispersed on the ocean surface with the oil, by wind and waves. Because the coated beads are preferably hydrophobic and because their density can be adjusted to be somewhat less than that of crude oil, they can follow the slicks, floating near their surface. Their transportation and dispersion costs should be similar to those for bulk free-flowing fertilizers.

It should be appreciated that in the preferred embodiments described above, the materials used for the beads and bead coatings are substantially safe to ingest, and thus will not significantly harm humans, fish, birds or vegetation.

EXAMPLE

The following example is designed to illustrate certain aspects of the present invention. The example is not intended to be comprehensive of all features and all embodiments of the present invention, and should not be construed as limiting the claims presented herein.

Experiments were carried out relating to photocatalytic oxidation of films of dodecane and hexadecane on distilled water by oxygen. Quartz boats were used with a free liquid surface area in the boats of ca. 20 cm$^2$. A filtered medium pressure Hg light source with wavelengths shorter than ca. 2900 angstroms was used for illumination. The irradiance was estimated to be around 8 mW/cm$^2$ on the liquid surface. The photocatalyst was n-$TiO_2$ (from Dagusa, FRG, No. P25) in the form of ca. 30 nm diameter particles.

Experiments were conducted by placing in each boat ca. 50 cc. distilled water and ca. 0.5–1 cc. of oil to form the oil films. Usually, 10–100 mg of n-$TiO_2$ particles were scattered on the surface of the oil film prior to irradiation. The boats with water, oil and photocatalyst were placed under the UV light source and allowed to remain for periods from 12–72 hours. Residual oil remaining was determined by pouring the contents of each boat into a burette. This procedure had been determined to yield adequate accuracy in a number of tests on known oil volumes.

In one series of runs using hexadecane as the oil, illumination by the UV light source of a first boat with water, hexadecane oil films and n-$TiO_2$ photocatalyst was carried for ca. 65 hours. A second boat containing identical amounts of water, hexadecane but no n-$TiO_2$ was also exposed to the UV illumination. A third boat containing water, hexadecane, and n-$TiO_2$ photocatalyst was prepared to the same amounts as in the first boat, but not exposed to UV illumination. The first boat was illuminated for ca. 65 hours and was then removed from illumination. The pH of the water phase was determined to be ca. 4.1. The pH of water in the second and third boats was ca. 7.0, characteristic of distilled water used in the experiments. The oil phase from the three boats was subjected to GC-MS (gas chromatographic-mass spectrometry) using chemi-ionization. The analysis showed that the first boat yielded an oil with a composition of: $C_{10}H_{16}O_4$, $C_{12}H_{24}O$, $C_{13}H_{28}$, $C_{13}H_{28}$, $C_{16}H_{34}$, $C_{16}H_{32}O_2$, plus other undetermined species. (Results are somewhat uncertain as chemi-ionization was used in MS, but library was for eii). This together with the pH reading of 4.1 shows that the n-$TiO_2$ photocatalyst was effective in oxidizing the oil film in the presence of UV light.

This invention has been disclosed in connection with specific embodiments. However, it will be apparent to those skilled in the art that variations from the illustrated embodiments may be undertaken without departing the spirit and scope of the invention.

What is claimed is:

1. A method for treating an oil film floating on a body of water, comprising the steps of:
    dispersing a plurality of water floatable particles on such an oil film, the particles comprising a material that under illumination and in the presence of air is capable of accelerating the oxidation of organic compounds in the oil film; and
    allowing the particles to be exposed to solar illumination and ambient air such that the particles accelerate the oxidation of organic compounds in the oil film.

2. The method of claim 1, wherein the particle material comprises an inorganic material.

3. The method of claim 1, wherein the particle material comprises an n-type semiconductor having a band gap of at least about 2 eV.

4. The method of claim 1, wherein the particle material comprises a photoconductive material.

5. The method of claim 1, wherein the particle material comprises titanium dioxide, zinc oxide, zinc sulfide, or iron oxide.

6. The method of claim 1, wherein the particle material comprises rutile or anatase.

7. A method for treating an oil film floating on a body of water, comprising the steps of:
    dispersing a plurality of beads on such an oil film, the beads being at least partically coated with a material that under illumination and in the presence of air is capable of accelerating the oxidation of organic compounds in the oil film, each coated bead being water floatable and having an equivalent diameter of less than about 2 mm; and allowing the coated beads to be exposed to solar illumination and ambient air such that the coating material accelerates the oxidation of organic compounds in the oil film.

8. The method of claim 7, wherein each coated bead has a density less than the density of sea water.

9. The method of claim 7, wherein each coated bead has a density less than the density of water.

10. The method of claim 7, wherein each coated bead has a density less than 0.9 g/cm$^3$ at 20° C.

11. The method of claim 7, wherein each coated bead has a density less than 0.7 g/cm$^3$ at 20° C.

12. The method of claim 7, wherein the coated beads float at or near the surface of the oil film.

13. The method of claim 7, wherein each coated bead is substantially hydrophobic.

14. The method of claim 7, wherein each bead is additionally coated with a substantially hydrophobic material.

15. The method of claim 7, wherein each bead has an index of refraction of at least about 1.5.

16. The method of claim 7, wherein each bead has an index of refraction of at least about 1.6.

17. The method of claim 7, wherein the coating material on each bead has an index of refraction of at least about 2.0.

18. The method of claim 7, wherein the index of refraction of the coating material is higher than that of each bead.

19. The method of claim 7, wherein the coating material on each bead comprises an n-type semiconductor having a band gap of at least about 2 eV.

20. The method of claim 7, wherein the coating material on each bead comprises a photoconductive material.

21. The method of claim 7, wherein the coating material on each bead comprises titanium dioxide.

22. The method of claim 7, wherein the coating material on each bead comprises zinc oxide, zinc sulfide, or iron oxide.

23. The method of claim 7, wherein the beads comprise a glass material.

24. The method of claim 7, wherein the beads comprise a ceramic material.

25. The method of claim 23 or 24, wherein the beads are hollow.

26. The method of claim 7, wherein each bead comprises a plastic material coated with an intermediate layer comprising a material which will not accelerate the oxidation of the plastic material by air or itself be oxidized by the outer coating material.

27. The method of claim 7, wherein the plastic material comprises polyethylene or polypropylene.

28. The method of claim 26 or 27, wherein the intermediate layer material comprises silicon dioxide or aluminum oxide.

29. The method of claim 7, wherein each coated bead has an equivalent diameter of less than about 200 microns.

30. The method of claim 7, wherein each coated bead has an equivalent diameter of less than about 100 microns.

31. The method of claim 7, wherein each coated bead has an equivalent diameter of between about 10 and 30 microns.

32. The method of claim 7, wherein each coated bead has an equivalent diameter of at least 30 nm.

33. The method of claim 7, wherein each coated bead has an equivalent diameter less than the average thickness of the oil film.

34. The method of claim 7, wherein light is trapped by the beads and internally reflected to the coating material.

35. The method of claim 7, wherein the coating material comprises rutile or anatase.

* * * * *

UNITED STATES PATENT AND TRADEMARK OFFICE
CERTIFICATE OF CORRECTION

PATENT NO. : 4,997,576

DATED : March 5, 1991

INVENTOR(S) : Adam Heller and James R. Brock

It is certified that error appears in the above—identified patent and that said Letters Patent is hereby corrected as shown below:

In claim 7, column 8, line 65, "partically" should be --partially--.

Signed and Sealed this

Twenty-eighth Day of July, 1992

Attest:

DOUGLAS B. COMER

*Attesting Officer*     *Acting Commissioner of Patents and Trademarks*